(12) United States Patent
Khalid et al.

(10) Patent No.: US 10,181,122 B2
(45) Date of Patent: *Jan. 15, 2019

(54) MOBILE AUTHENTICATION FOR WEB PAYMENTS USING SINGLE SIGN ON CREDENTIALS

(71) Applicant: CELLCO PARTNERSHIP, Basking Ridge, NJ (US)

(72) Inventors: Mohammad Raheel Khalid, Budd Lake, NJ (US); Ji Hoon Kim, Lyndhurst, NJ (US); Cory Michael Bruno, South River, NJ (US); Paul Berman, Roselle Park, NJ (US); Mauricio Pati Caldeira de Andrada, South Plainfield, NJ (US); Samir Vaidya, Highland Park, NJ (US)

(73) Assignee: Cellco Partnership, Basking Ridge, NJ (US)

(*) Notice: Subject to any disclaimer, the term of this patent is extended or adjusted under 35 U.S.C. 154(b) by 815 days.

This patent is subject to a terminal disclaimer.

(21) Appl. No.: 14/069,323

(22) Filed: Oct. 31, 2013

(65) Prior Publication Data

US 2015/0120549 A1  Apr. 30, 2015

(51) Int. Cl.
*G06Q 40/00* (2012.01)
*G06Q 20/40* (2012.01)
*G06Q 20/32* (2012.01)
*G06Q 30/02* (2012.01)
*G06Q 20/16* (2012.01)

(52) U.S. Cl.
CPC ....... *G06Q 20/4014* (2013.01); *G06Q 20/325* (2013.01); *G06Q 20/3224* (2013.01); *G06Q 20/40145* (2013.01); *G06Q 20/16* (2013.01); *G06Q 20/32* (2013.01); *G06Q 30/0222* (2013.01)

(58) Field of Classification Search
CPC ..... G06Q 20/16; G06Q 20/32; G06Q 30/0222
See application file for complete search history.

(56) References Cited

U.S. PATENT DOCUMENTS

| | | |
|---|---|---|
| 6,459,988 B1 | 10/2002 | Fan et al. |
| 6,490,443 B1 | 12/2002 | Freeny |
| 6,496,855 B1 | 12/2002 | Hunt et al. |
| 6,594,765 B2 | 7/2003 | Sherman et al. |
| 6,607,136 B1 | 8/2003 | Atsmon et al. |
| 6,708,171 B1 | 3/2004 | Waldo et al. |
| 6,732,278 B2 | 5/2004 | Baird et al. |
| 7,076,797 B2 | 7/2006 | Loveland |
| 7,275,685 B2 * | 10/2007 | Gray ............... G06Q 20/10 235/380 |

(Continued)

*Primary Examiner* — Scott S Trotter (57) ABSTRACT

Systems and methods for mobile authentication for web payments are disclosed. In some implementations, a proxy server receives, from a computing device different from a mobile device, a request from a user to process a web payment via a payment account associated with the mobile device, the web payment being associated with an online merchant. The proxy server verifies that the mobile device is associated with the user. The proxy server transmits, to a commerce server of the online merchant, payment information for the web payment in response to verifying that the mobile device is associated with the user.

18 Claims, 7 Drawing Sheets

(56) References Cited

U.S. PATENT DOCUMENTS

| | | | |
|---|---|---|---|
| 7,430,537 B2 * | 9/2008 | Templeton | G06Q 10/0635 |
| | | | 705/26.35 |
| 7,610,616 B2 | 10/2009 | Masuouka et al. | |
| 7,672,644 B2 | 3/2010 | Sun et al. | |
| 7,685,629 B1 | 3/2010 | White et al. | |
| 7,860,488 B2 | 12/2010 | Wollersheim et al. | |
| 8,005,075 B1 | 8/2011 | Webster et al. | |
| 8,059,542 B1 | 11/2011 | Oroskar et al. | |
| 8,442,526 B1 | 5/2013 | Bertz et al. | |
| 8,443,425 B1 * | 5/2013 | Evans | G06F 21/31 |
| | | | 726/26 |
| 8,646,060 B1 | 2/2014 | Ben Ayed | |
| 8,649,768 B1 | 2/2014 | Gaddam et al. | |
| 8,995,992 B1 | 3/2015 | Cohen | |
| 9,112,883 B2 | 8/2015 | Abbott et al. | |
| 9,246,918 B2 | 1/2016 | Marshall et al. | |
| 9,325,687 B2 | 4/2016 | Caldeira De Andrada et al. | |
| 2002/0145043 A1 | 10/2002 | Challa et al. | |
| 2003/0084171 A1 | 5/2003 | De Jong et al. | |
| 2003/0220765 A1 | 11/2003 | Overy et al. | |
| 2005/0105734 A1 * | 5/2005 | Buer | G07C 9/00007 |
| | | | 380/270 |
| 2007/0136573 A1 | 6/2007 | Steinberg | |
| 2008/0022375 A1 | 1/2008 | Stanley | |
| 2008/0262928 A1 | 10/2008 | Michaelis | |
| 2008/0295159 A1 | 11/2008 | Sentinelli | |
| 2009/0037732 A1 | 2/2009 | Boccon-Gibod et al. | |
| 2009/0132813 A1 | 5/2009 | Schibuk | |
| 2009/0247186 A1 | 10/2009 | Ji et al. | |
| 2009/0265775 A1 | 10/2009 | Wisely et al. | |
| 2009/0271850 A1 | 10/2009 | Hoppe et al. | |
| 2010/0022254 A1 | 1/2010 | Ashfield et al. | |
| 2010/0035590 A1 | 2/2010 | Martin | |
| 2011/0111737 A1 | 5/2011 | Abbott et al. | |
| 2011/0258689 A1 | 10/2011 | Cohen et al. | |
| 2011/0271331 A1 | 11/2011 | Adams et al. | |
| 2012/0185166 A1 | 7/2012 | Chiang et al. | |
| 2012/0196566 A1 | 8/2012 | Lee et al. | |
| 2012/0302163 A1 * | 11/2012 | Kitchen | H04B 5/00 |
| | | | 455/41.1 |
| 2013/0103478 A1 * | 4/2013 | Fisher | G06Q 20/20 |
| | | | 705/14.23 |
| 2013/0111208 A1 | 5/2013 | Sabin et al. | |
| 2013/0205380 A1 | 8/2013 | Avni et al. | |
| 2013/0227668 A1 | 8/2013 | Mocanu | |
| 2013/0262311 A1 * | 10/2013 | Buhrmann | G06Q 20/3224 |
| | | | 705/44 |
| 2014/0045454 A1 | 2/2014 | Monjas Llorente et al. | |
| 2014/0049636 A1 * | 2/2014 | O'Donnell | G08C 17/02 |
| | | | 348/143 |
| 2014/0096215 A1 | 4/2014 | Hessler | |
| 2014/0171024 A1 * | 6/2014 | Huang | H04W 12/06 |
| | | | 455/411 |
| 2014/0177481 A1 | 6/2014 | Gaviria et al. | |
| 2014/0201517 A1 | 7/2014 | Corrion | |
| 2014/0222676 A1 * | 8/2014 | Lee | G06Q 20/322 |
| | | | 705/44 |
| 2014/0273965 A1 | 9/2014 | Raleigh et al. | |
| 2014/0380444 A1 | 12/2014 | Kelley | |
| 2015/0120549 A1 | 4/2015 | Khalid et al. | |
| 2015/0121496 A1 | 4/2015 | Caldeira De Andrada et al. | |
| 2015/0121501 A1 | 4/2015 | Khalid et al. | |
| 2015/0127939 A1 | 5/2015 | Mazandarany et al. | |
| 2015/0288661 A1 | 10/2015 | Monk et al. | |

* cited by examiner

MOBILE AUTHENTICATION FOR WEB PAYMENTS USING SINGLE SIGN ON CREDENTIALS

CROSS-REFERENCE TO RELATED APPLICATIONS

This application is related to U.S. Pat. No. 9,627,482, concurrently filed herewith and titled "MOBILE BASED LOGIN VIA WIRELESS CREDENTIAL TRANSFER," U.S. Pat. No. 9,325,687, concurrently filed herewith and titled "REMOTE AUTHENTICATION USING MOBILE SINGLE SIGN ON CREDENTIALS," and U.S. application Ser. No. 14/069,310, concurrently filed herewith and titled "CONNECTED AUTHENTICATION DEVICE USING MOBILE SINGLE SIGN ON CREDENTIALS." The entire content of the above-identified applications are incorporated herein by reference.

BACKGROUND

In order to make a payment to an online merchant, a user may need to provide payment account information and shipping information. Providing this information may be a cumbersome process, as the user may need to look up his/her payment account (e.g., credit card) information and typing long shipping addresses is time consuming and error prone. As the foregoing illustrates, a new approach for securely making a payment to an online merchant may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As set forth above, entering payment information at a website of an online merchant, associated with a commerce server, may be a cumbersome and error prone process. However, oftentimes, a user may have a mobile device. The mobile device may locally store the user's payment account information (e.g., credit card number and shipping address) or the mobile device may be associated with a service provider (e.g., a telephone company or an operator of a mobile application store) that stores the user's payment account information for processing repeated payments of the user (e.g., automatic payments of a telephone bill or mobile application purchase(s)). According to some implementations of the subject technology, the mobile device may be used to automatically provide payment information to the online merchant.

In one implementation, a proxy server (e.g., a server associated with the telephone company or the operator of the mobile application store) receives, from a laptop or desktop computer being accessed by a user, a request to process a web payment via an account associated with a mobile device. The web payment is associated with an online merchant. For example, the user may order a textbook from an online bookstore. The proxy server in response verifies that the mobile device is associated with the user. For example, the proxy server may send a message to the mobile device asking the user of the mobile device to confirm the purchase. The message may be, for example, a short messaging service (SMS) message or a push notification. Upon receiving confirmation from the user via the mobile device, the proxy server transmits to a commerce server of the online merchant the payment information for the web payment. In some implementations, only a response from the mobile device allows authorization of the web payment. In some embodiments, a lockout timer is used so that for a period of time only the mobile device (e.g., a mobile phone) can be used to authenticate. According to some examples, time and/or geographic limitations may be placed on when a web payment can be processed via the mobile device. For example, the proxy server may verify that the mobile device is geographically proximate (e.g., within 100 meters of one another or in the same city) to the computing device, that the mobile device and the computing device are located within the United States, or that the mobile device and the computing device are being used between 7 AM and 11 PM local time. For example, it is unlikely that an American who lives and works in New York City will be making an online purchase at 3 AM local time from a computer in Moscow, Russia.

A website that is integrated with a mobile payment application programming interface (API) of a telephone company may, at the time of checkout, ask the user if he/she would like to use his/her mobile phone on the telephone company's network to complete the purchase. In response, the user may enter and submit his/her mobile phone number to the website. The website may send the mobile phone number to the telephone company's backend server and retrieve a challenge in the form of a pin, a slide pattern, a text string, a motion pattern, etc. The telephone company's backend server may push the message to the mobile telephone number via a cloud or wireless application protocol (WAP) push. The message may instruct the user to input a valid response to the challenge. The mobile phone may bring a payment application to the foreground to enable the user to input a valid response to the challenge. The user may enter the valid response to the challenge in a number of ways. For example, the user may textually communicate the response to the challenge to the payment application. Alternatively, the user may verbally or by using some movement mechanism for the mobile phone communicate the response to the challenge to the payment application. The payment application may submit the response to the telephone company's backend server with a single sign on (SSO) token for authenticating the mobile phone. The SSO authenticates the mobile phone and the validity of the response to the challenge from the user. The telephone company's backend server may authenticate the website and send payment information (e.g., billing via the telephone company's monthly bill, credit card number, billing address, shipping address, etc.) to the website. Alternatively, the payment may be completed via credit card billing at the telephone company's backend server and the funds may be forwarded to the website after they are received by the telephone company from the credit card. The telephone company's backend server may also send a receipt to the payment application on the mobile phone. Reference now is made in detail to the examples illustrated in the accompanying drawings and discussed below.

Figure 1:
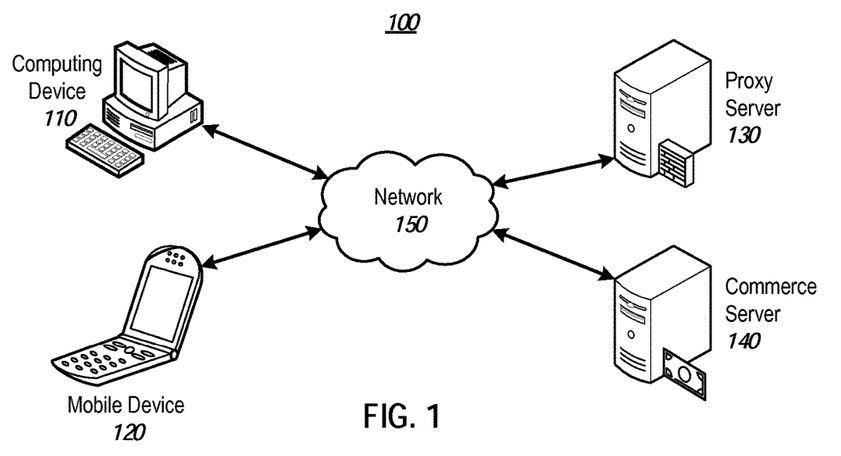
FIG. 1 illustrates an exemplary system for mobile authentication of a web payment.

FIG. 1 illustrates an exemplary system 100 for mobile authentication of a web payment. As shown, the system 100 includes a computing device 110, a mobile device 120, a proxy server 130, and a commerce server 140 connected to one another via a network 150. The network 150 may include any network(s), for example, the Internet, an intranet, a virtual private network, a local area network, a wide area network, a wired network, a wireless network, etc. While a single computing device 110, mobile device 120, proxy server 130, and commerce server 140 are illustrated, the subject technology may be implemented in conjunction with any number of computing device(s), mobile device(s), proxy server(s), and commerce server(s).

The computing device 110 may be any computing device, for example, a desktop computer, a laptop computer, a tablet computer, a mobile phone, a personal digital assistant (PDA), a digital music player, a smart watch, etc. The computing device may include a web browser configured to display a website associated with an online merchant of the commerce server 140.

The mobile device 120 is separate and distinct from the computing device 110. The mobile device 120 may be any computing device, for example, a tablet computer, a mobile phone, a personal digital assistant (PDA), a digital music player, a smart watch, etc. The mobile device 120 may locally store payment account information (e.g., a credit card number and a shipping address, a checking account number, information for billing through a telephone company, etc.) of a user. Alternatively, the payment account information may be stored at a server (e.g., at proxy server 130) in association with the mobile device 120.

The proxy server 130 communicates with the mobile device 120 via the network 150. The proxy server 130 may be a server of a telephone company of the mobile device 120 or a server operating an application store of the mobile device 120. The proxy server may be a server associated with a developer of an operating system of the mobile device 120. The proxy server 130 may be programmed to execute one or more of the processes described below in conjunction with FIG. 3 or FIG. 5.

The commerce server 140 is associated with an online merchant. The commerce server 140 communicates with the computing device 110 and provides a website of an online merchant and a payment interface for providing a payment to the online merchant from the computing device 110. The commerce server 140 may be programmed to execute one or more of the processes described below in conjunction with FIG. 4 or FIG. 6.

Figure 2:
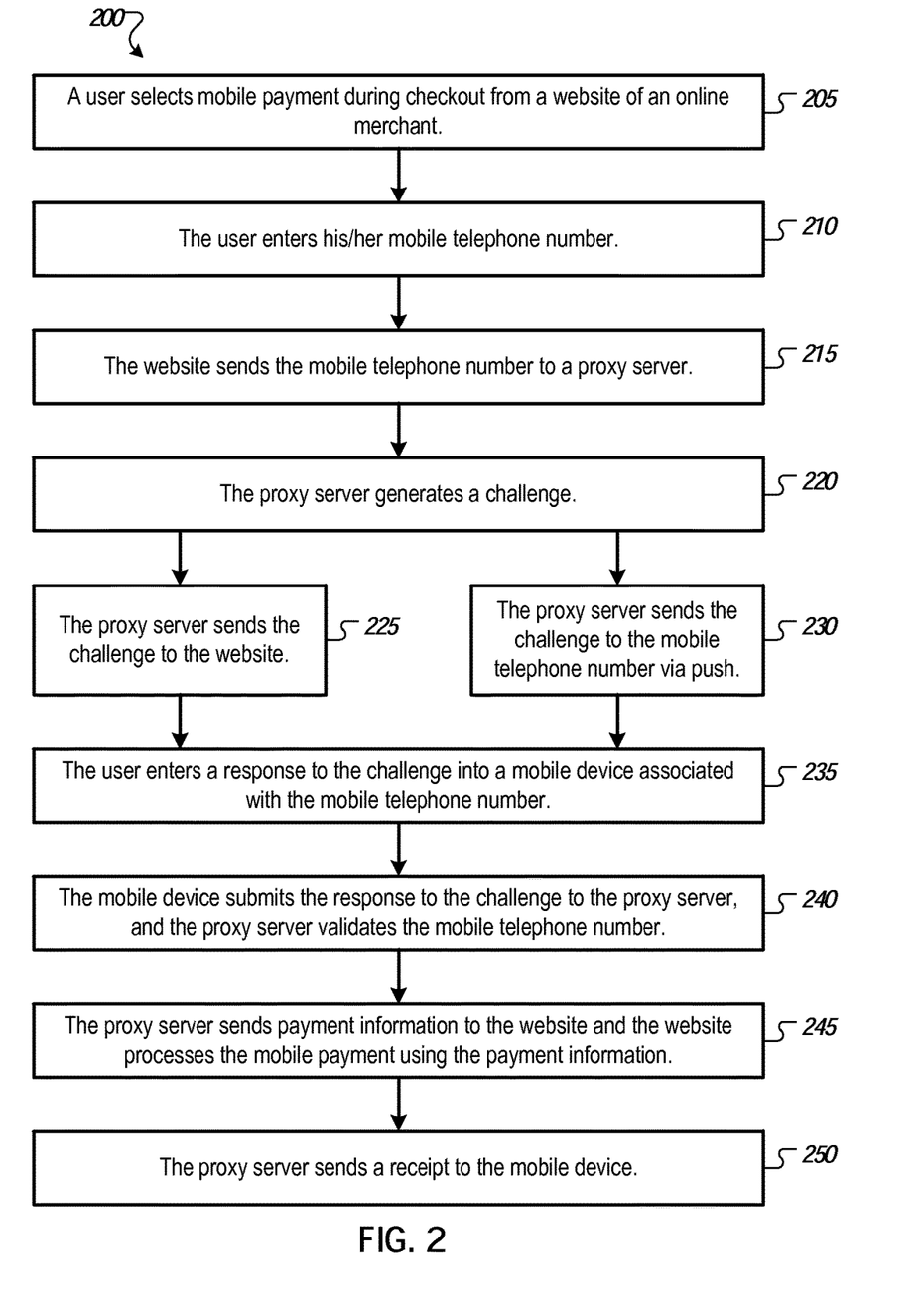
FIG. 2 illustrates an exemplary process for authenticating a payment using a mobile device.

FIG. 2 illustrates an exemplary process 200 for authenticating a payment using a mobile device. The process 200 begins at step 205, where a user of a computing device (e.g., computing device 110) selects mobile payment during checkout from a website of an online merchant. The website may be hosted at a commerce server (e.g., commerce server 140) of the online merchant and displayed at the computing device. The user may own a mobile device (e.g., mobile device 120) which may be associated with payment information. The payment information may be stored locally at the mobile device or at a proxy server (e.g., proxy server 130) associated with the mobile device. The proxy server associated with the mobile device may be a server of a telephone company of the mobile device or of a developer of an operating system or an application store on the mobile device.

In step 210, the user enters his/her mobile telephone number. The mobile telephone number may be entered into a text box in the website hosted at a commerce server (e.g., commerce server 140) in response to a prompt for the mobile telephone number at the website hosted at the commerce server. For example, the user may enter the mobile telephone number 310-555-1234. The computing device may send the mobile telephone number to the commerce server, which may forward the telephone number to the proxy server in step 215. The computing device, commerce server, proxy server, and mobile device may communicate with one another over a network (e.g., network 150).

In step 220, the proxy server generates a challenge for the mobile device to verify that a payment account associated with the mobile device is authorized to be used for making the payment to the online merchant. The challenge may include any known challenge, for example, a text-based challenge, a pin-based challenge, a pattern challenge, a movement-based challenge, etc. The type of challenge may be selected based on a user input, at the mobile device, of the preferred type of challenge of the user. According to some examples, the challenge may be a short messaging service (SMS) message sent to the mobile device, asking a user of the mobile device to respond "Yes" or "No" to the question sent via the SMS message, "Did you attempt to make a payment to «URL» for «AMOUNT»?", where «URL» represents all or a portion of the uniform resource locator of the website and «AMOUNT» represents an amount of money to be paid. For example, the SMS message may be, "Did you attempt to make a payment to store.com for $49.99? Reply with YES or NO." According to some examples, the SMS message challenge may be combined with a text-based challenge, a pin-based challenge, a pattern challenge, a movement-based challenge, etc. For example, after responding "YES" to the SMS message, the user may be presented with a text-based challenge asking at the computing device the user to enter the text "happiness" into an application executing on the mobile device. After step 220, the process 200 continues to either step 225 or step 230 depending on the programming of the proxy server.

In step 225, the proxy server sends the challenge to the website hosted at the commerce server. In some examples, the challenge may include a numeric or textual pin displayed at the website for the user to enter into the mobile device. For example, the website may ask the user to enter the word "happiness" into an application of the mobile phone. Upon receiving a valid response to the challenge—the entry of the word "happiness" into the application of the mobile phone— the payment may be authenticated. In other examples, the challenge may include a screen image displayed at the website hosted at the commerce server of which the user can take a photograph with the mobile device to provide a valid response. Alternatively, the challenge may include an audio output and a valid response to the challenge may include a recording of the audio output taken via a microphone of the mobile device. After step 225, the process 200 continues to step 235.

In step 230, the proxy server sends the challenge to the mobile telephone number via a push notification. The challenge may be received at a mobile device having the mobile telephone number. In some implementations, the challenge may include a request for a biometric scan of the user at the mobile device, and a valid response to the challenge may include verification, from the mobile device, that a biometric scan was taken at the mobile device and successfully identified the user. It should be noted that, in these implementations, the biometric information of the user may be stored locally at the mobile device and may, in some cases, not be provided to any servers external to the mobile device. Server(s) external to the mobile device may receive verification, from the mobile device, that the biometric scan was successful. The biometric scan may include a fingerprint scan or a facial scan.

In step 235, the user enters a response to the challenge into the mobile device associated with the mobile telephone number. The mobile device may be running a special purpose application for receiving the response to the challenge. Alternatively, the response to the challenge may be transmitted by SMS or multimedia messaging service (MMS), and the mobile device may be running a SMS or MMS application. Depending on the type of challenge, the response to the challenge may include an entry of text, an audio recording, a photograph, a biometric scan, etc.

In step 240, the mobile device submits the response to the challenge to the proxy server. Upon receiving a valid response to the challenge, the proxy server validates the mobile telephone number for transmitting the payment. In some cases, the payment information may be stored at the proxy server. Alternatively, the payment information may be transmitted from the mobile device to the proxy server in conjunction with the response to the challenge.

In step 245, the proxy server sends the payment information to the website hosted at the commerce server. The proxy server may send the payment information to the commerce server hosting the website. The website or the commerce server processes the mobile payment using the payment information. For example, the website or commerce server may charge an account associated with the payment information and transmit the funds from the charge to an account associated with the online merchant. The payment information may include credit card information, for example, a credit card number to be charged. Alternatively, the payment information may include a charge to a telephone service account of the user. For example, if the user makes a purchase for $50, the user's monthly telephone bill for the current month may be increased by $50. Furthermore, in some examples, the user may also be charged a fee (e.g., a few cents) for the processing of the payment via the user's monthly telephone bill. This fee may also be added to the user's monthly telephone bill. In some cases, the verification may be unsuccessful. In such cases, the user may be provided with another opportunity for verification, for example, another challenge. After unsuccessfully responding to a certain number of challenges (e.g., three challenges), the user may be locked out of making mobile-based web payments until the user verifies that he/she still has possession of his/her mobile device. For example, the user may be required to visit a webpage or an application on the mobile device in order to re-register the mobile device for the mobile-based payment service. The webpage or the application may include an input for identifying the mobile device and for identifying the payment account (e.g., credit card account, checking account, or cellular carrier-based billing) to be used for payments in conjunction with the mobile device.

In step 250, the proxy server sends a receipt to the mobile device. The mobile device may include an application for storing payment receipts. Alternatively, the receipt may be provided to the mobile device as a text file or an image file transmitted via SMS or MMS. After step 250, the process 200 ends.

Figure 3:
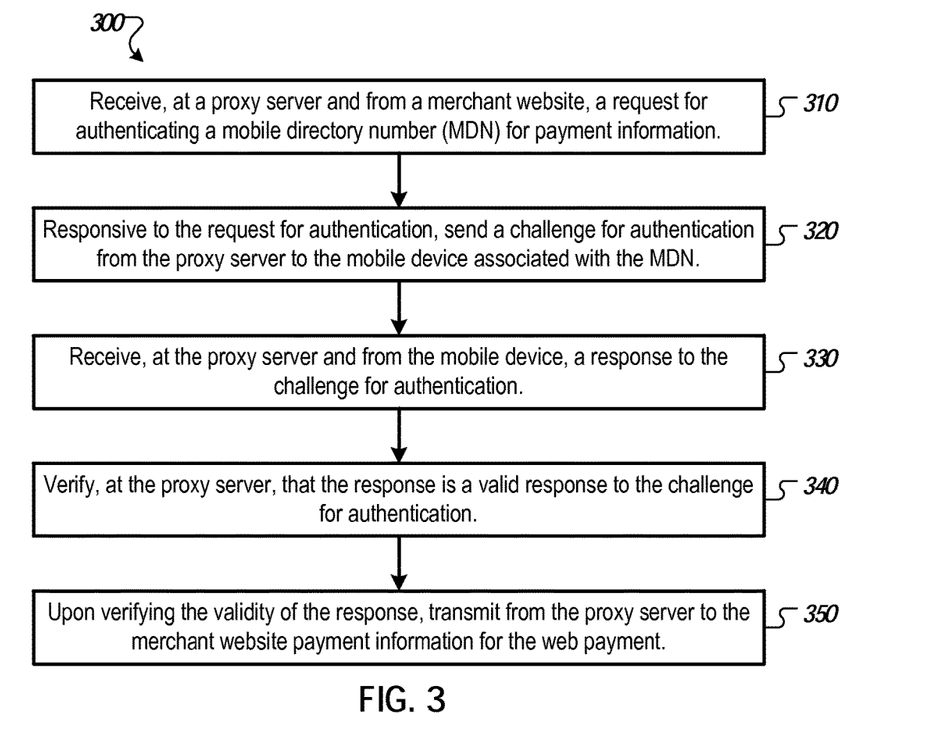
FIG. 3 illustrates an exemplary process for a proxy server to authenticate a payment using a mobile directory number.

FIG. 3 illustrates an exemplary process 300 for a proxy server to authenticate a payment using a mobile directory number. The process 300 begins at step 310, where a proxy server receives, from a merchant website hosted at a commerce server (e.g., commerce server 140), a request for authenticating a mobile directory number (MDN) for payment information. The request for authenticating the MDN may include a user input of the MDN. For example, a user may have requested to make a payment to the merchant website hosted at the commerce server using payment information associated with the MDN. For example, the MDN may be associated with a monthly telephone bill to which additional charges (e.g., a charge from the merchant website) may be added or the MDN may be associated with a stored credit card account and shipping address.

In an alternative implementation, the request for authenticating the MDN may include a geographic location of a computing device accessing the merchant website and may lack the MDN. The computing device accessing the merchant website may determine its geographic location based on one or more global positioning system (GPS), WiFi, cellular, or IP address signals accessible to the computing device. The proxy server may identify the MDN based on a geographic proximity of a device associated with the MDN and running a mobile payment application to the geographic location of the computing device accessing the merchant website. The mobile payment application, when executing on a mobile device, may determine the geographic location of the mobile device and transmit the determined geographic location to the proxy server. The geographic location may be determined and transmitted in response to a notification, from the proxy server, that a computing device is attempting to make a mobile-based payment. Alternatively, the geographic location may be determined and transmitted once every threshold time period (e.g., once every three minutes). The threshold time period may be constant (e.g., always three minutes) or variable depending on whether an accelerometer of the mobile device indicates that the mobile device is moving or stationary (e.g., once every one minute when moving and once every five minutes when stationary). The mobile payment application of the device associated with the MDN may determine the geographic location of the device based on one or more GPS, WiFi, cellular, or IP address signals accessible to the device and may transmit the geographic location to the proxy server. In some cases, more than one MDN may be proximate to the geographic location of the computing device. In these cases, the MDN associated with the user may be identified based on a challenge transmitted to the computing device, a challenge transmitted to the MDN, or a time when a request for a payment was being placed at the MDN being within a threshold time period (e.g., 2 seconds, 5 seconds, etc.) when a request for a payment was placed at the computing device.

In step 320, the proxy server, in response to the request for authentication, sends a challenge from the proxy server to the mobile device associated with the MDN. The MDN may be identified in the original authentication request (e.g., with the user providing the MDN via the web site). Alternatively, the MDN may be identified based on the geographic proximity of a mobile phone having the MDN to the computing device. The challenge may be sent using a payment application of the mobile device, via a push notification, or via a SMS or MMS message. For example, the challenge may include a request for the user to verify that he/she wishes to make a payment to the merchant.

In step 330, the proxy server receives, from the mobile device, a response to the challenge for authentication. The user may provide a user input responsive to the challenge. For example, the user may verify that he/she wishes to make the payment to the merchant.

In step 340, the proxy server verifies that the response is a valid response to the challenge for authentication. For example, the proxy server may compare the response to a stored valid response and conclude that the two are identical or substantially similar. Two responses may be substantially similar if a Hamming distance between the two responses is less than a threshold Hamming distance.

In step 350, upon verifying the validity of the response, the proxy server transmits to the merchant website hosted at the commerce server payment information for the web payment. For example, the proxy server may transmit an authorization to add a charge to the user's monthly mobile phone bill. Alternatively, the proxy server may transmit the user's credit card information. After step 350, the process 300 ends.

Figure 4:
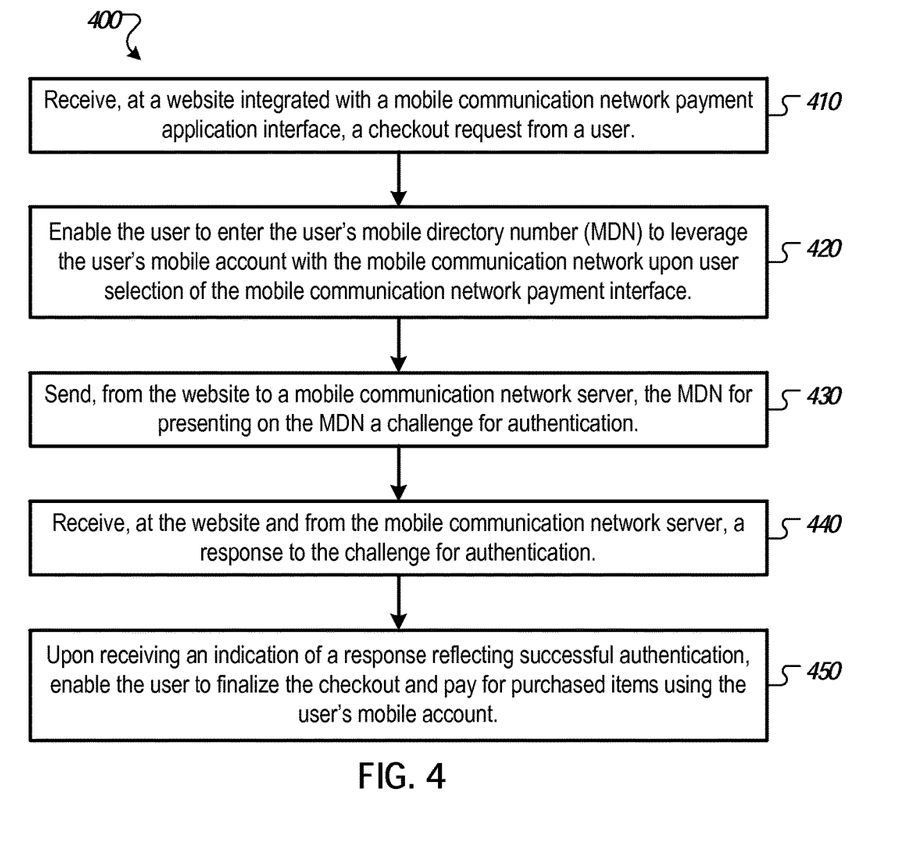
FIG. 4 illustrates an exemplary process for a commerce server to authenticate a payment using a mobile directory number.

FIG. 4 illustrates an exemplary process 400 for a commerce server to authenticate a payment using a mobile directory number. The process 400 begins at step 410, where a website integrated with a mobile communication network payment application interface receives a checkout request from a user. The website may be hosted at a commerce server (e.g., commerce server 140). For example, the user may be accessing the website from a computing device (e.g., computing device 110) different from his/her mobile device (e.g., mobile device 120). The user may add item(s) to an online shopping cart and enter the checkout request after he/she has selected the items. The checkout request may indicate that the user intends to make a payment using an account associated with a mobile directory number (MDN).

In step 420, the website hosted at the commerce server enables the user to enter the user's MDN to leverage the user's mobile account with the mobile communication network upon user selection of the mobile communication network payment interface. For example, the website may present a user interface configured to receive the user's MDN. The MDN may correspond to a telephone number of the user, for example, 310-555-1234.

In step 430, the website hosted at the commerce server sends, to a mobile communication network server (e.g., proxy server 130), the MDN for presenting, on the mobile device associated with the MDN (e.g., the mobile device 120), a request for challenge for authentication. The challenge may include a request to confirm the payment, a request to enter a pin or a password, or a request to provide biometric information. The mobile communication network server receives the request and sends the challenge to the mobile device associated with the MDN via a cellular network.

In step 440, the website hosted at the commerce server receives, from the mobile communication network server, a response to the challenge for authentication. The website may receive a copy of the response from the mobile device associated with the MDN (e.g., the text entered by the user at the mobile device). Alternatively, the website may receive an indication that that the user successfully responded to the challenge, without receiving the copy of the response from the mobile device. The authentication may take place at the proxy server, with a correct response to the challenge being stored at the proxy server and the response entered at the mobile device being transmitted to the proxy server for verification. Alternatively, the mobile device itself may verify that the response to the challenge is correct. For example, if a biometric challenge (e.g., a fingerprint or facial recognition challenge) is used and the biometric information is stored locally at the mobile device and not at the proxy server. The mobile device may transmit an indication that the user successfully responded to the challenge to the proxy server or directly to the commerce server.

In step 450, upon receiving an indication of the response reflecting successful authentication, the website hosted at the commerce server enables the user to finalize the checkout and pay for purchased items using the user's mobile account. The indication of the response reflecting successful authentication may be received from the mobile communication network server. Enabling the user to finalize the checkout and pay for the purchased items using the user's mobile account may include receiving, at the website and from the mobile communication network server, a payment account number (e.g., a credit card number or a checking account number) and a shipping address of the user. After step 450, the process 400 ends.

Examples of the subject technology described above include a mobile device identified by a MDN. However, other approaches for identifying a mobile device may also be used. For example, a mobile device may be associated with an operating system developer (e.g., Apple®) and identified by an operating system developer identifier (e.g., Apple ID®). A mobile device may include an application store (e.g., Apple App Store® or iTunes Store®) and be associated with an application store identifier (e.g., Apple App Store ID® or iTunes Store ID®). In some case, the mobile device may lack a MDN. For example, a personal digital music player, a tablet computer, or a mobile phone without a valid and operational subscriber identity module (SIM) card installed may lack a MDN. Devices lacking a MDN may be identified by an operating system identifier (e.g., an Apple ID®) or an application store identifier (e.g., Apple App Store ID® or iTunes Store ID®).

Figure 5:
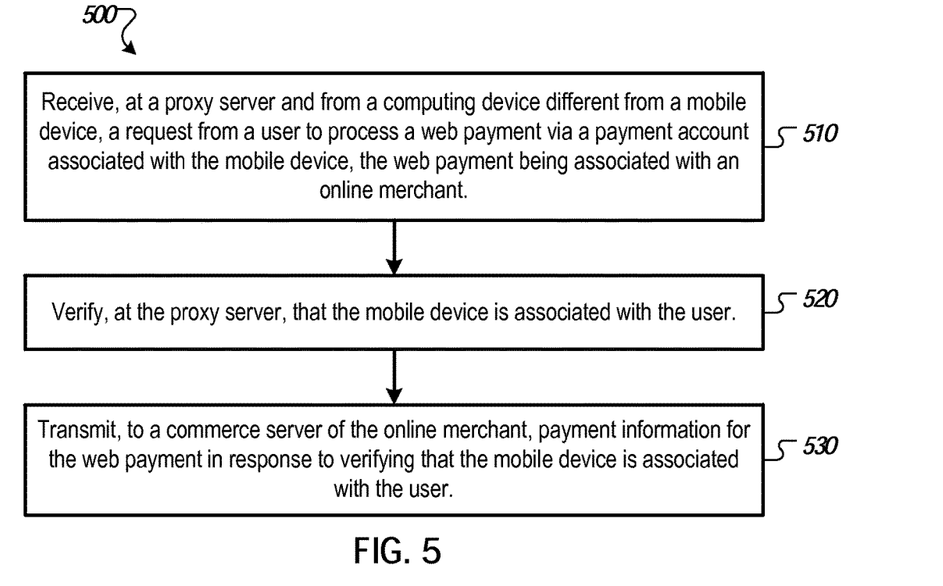
FIG. 5 illustrates another exemplary process for a proxy server to authenticate a payment using a mobile device.

FIG. 5 illustrates an exemplary process 500 for a proxy server to authenticate a payment using a mobile device. The process 500 begins at step 510, where a proxy server (e.g., proxy server 130) receives, from a computing device (e.g., computing device 110) different from a mobile device (e.g., mobile device 120), a request from a user to process a web payment via a payment account associated with the mobile device. The web payment is associated with an online merchant. The web payment may be requested via a website of the online merchant or via an application executing on the computing device (e.g., a tablet computer application) for shopping at the online merchant. The website may be hosted at a commerce server (e.g., commerce server 140).

In step 520, the proxy server verifies that the mobile device is associated with the user requesting the web payment. For example, the proxy server may send a message to the mobile device asking the user of the mobile device to confirm that he/she wishes to make the web payment. The message may identify the online merchant and the amount of the web payment. In response to the message, the proxy server may receive, from the mobile device, a confirmation of the request to process the web payment. In some cases, the proxy server may transmit a challenge to one of the mobile device or the computing device. The proxy server may receive, from another one of the mobile phone or the computing device, an indication that the user entered a valid response to the challenge at the other one of the mobile phone or the computing device.

In some aspects, receiving, at the proxy server, the request from the user to process the web payment and verifying that the mobile device is associated with the user may include receiving, from the computing device, an indication of a button (e.g., a space bar) on the computing device being selected. The button corresponds to the request for processing the web payment via the payment account associated with the mobile device. The proxy server may also receive, from the mobile device, an indication of an acceleration of the mobile device being within a range corresponding to selecting (e.g., hitting) the button on the computing device with the mobile device. The acceleration of the mobile device may be measured by an accelerometer within the mobile device. Some mobile devices (e.g., the Apple iPhone 4S®) include an accelerometer to allow a user to play games that involve accelerating the mobile device or measure the user's acceleration when engaging in fitness activities, among other things.

The user may be instructed to hit the button (e.g., the space bar) on the computing device with the mobile phone, while the mobile phone is running a payment application. Hitting the button on the computing device causes the computing device to request a payment and accelerating the mobile device at the acceleration corresponding to hitting the button causes the mobile device to request the payment. As a result of this technique, a request for a payment may be transmitted from the mobile device and from the computing device at substantially the same time or within a threshold time period (e.g., 2 seconds, 5 seconds, etc.) of one another. Also, the computing device and the mobile device may be geographically proximate to one another or within a threshold distance (e.g., 2 meters, 5 meters, etc.) of one another at the time the request for the payment is transmitted, allowing the proxy server to pair the computing device and the mobile device transmitting the payment request(s) based on the time and geographic proximity of the source(s) of the transmitted request(s). In some examples, the pairing of the mobile phone and the computing device may be based on multiple factors or parameters, for example, time, geographic location, audio recording(s) at the time of contact, short-range radio (e.g., Bluetooth® or WiFi) information, etc. Other factors or parameters, in addition to those listed above, may be used.

In some examples, the mobile device is a mobile phone. The request from the user to process the web payment via the payment account associated with the mobile device may include a mobile directory number (MDN) of the mobile device. A data repository associated with the proxy server (e.g., a memory of the proxy server) may store the payment information in association with the MDN of the mobile device.

In some examples, the mobile device is associated with a developer of an operating system (e.g., Android®) or an application store (e.g., Google Play App Store®). The request from the user to process the web payment via the payment account associated with the mobile device may include an operating system identifier or an application store identifier of the mobile device. A data repository associated with the proxy server (e.g., a memory of the proxy server) may store the payment information in association with the operating system identifier or the application store identifier of the mobile device.

In step 530, the proxy server transmits, to a commerce server (e.g., commerce server 140) of the online merchant, payment information for the web payment in response to verifying that the mobile device is associated with the user. The payment information may be transmitted securely, in an encrypted form. The payment information may include a credit card number. After step 530, the process 500 ends.

Figure 6:
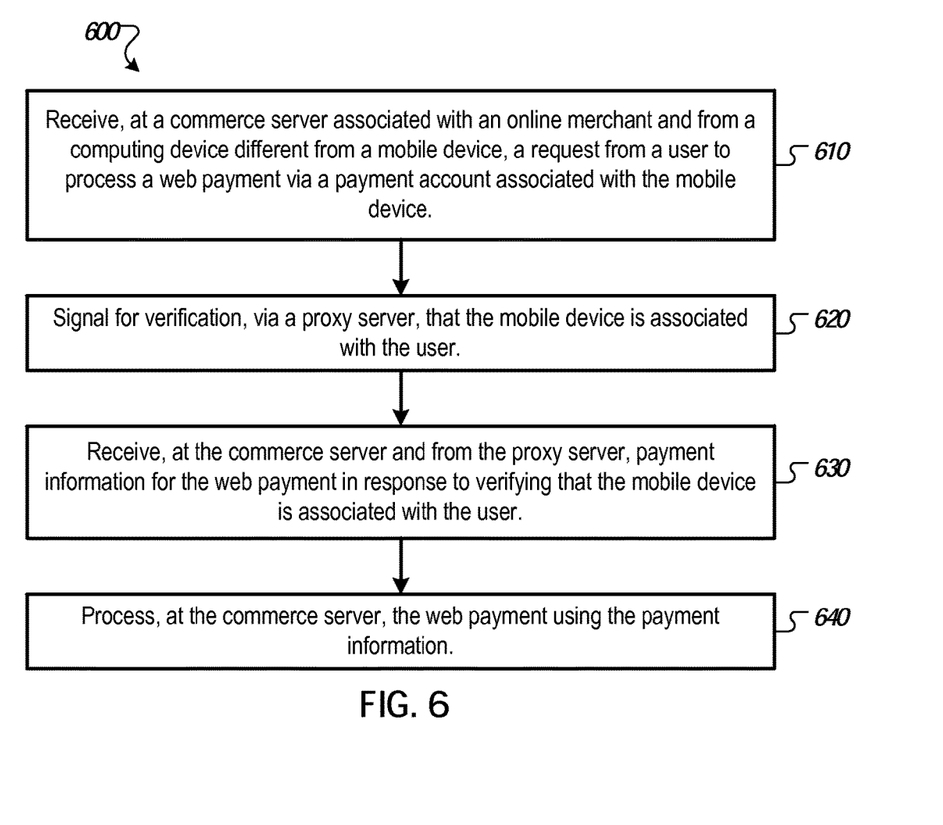
FIG. 6 illustrates another exemplary process for a commerce server to authenticate a payment using a mobile device.

FIG. 6 illustrates an exemplary process 600 for a commerce server to authenticate a payment using a mobile device. The process 600 begins at step 610, where a commerce server (e.g., commerce server 140) associated with an online merchant receives, from a computing device (e.g., computing device 110) different from a mobile device (e.g., mobile device 120), a request from a user to process a web payment via a payment account associated with the mobile device. For example, the user may access a mobile payment-based checkout website of the online merchant after placing some items in his/her virtual shopping cart. The website may be hosted at the commerce server. The request to process the web payment via the payment account associated with the mobile device may include an indication of a button (e.g., a space bar) on the computer being hit (e.g., with the mobile phone). The hitting of the button corresponds to the request for processing the web payment. For example, the user may be instructed to hit the space bar with his/her mobile device if he/she wishes to pay via the payment account associated with the mobile device. Alternatively, the request to process the web payment via the payment account associated with the mobile device may include an input of the MDN of the mobile device.

In step 620, the commerce server signals for verification, via a proxy server (e.g., proxy server 130), that the mobile device is associated with the user. For example, the proxy server may push a message to the mobile device asking the user of the mobile device to confirm that he/she intends to make the payment to the online merchant. Alternatively, the commerce server may send a challenge to the mobile device to allow the user of the mobile device to confirm his/her identity, for example, via entering a password.

In step 630, the commerce server receives, from the proxy server, payment information for the web payment in response to verifying that the mobile device is associated with the user. The payment information may include a payment account number and a shipping address. The payment account number may be a credit card number, a checking account number, a gift card number, an account number with an online money transfer service, etc.

In step 640, the commerce server processes the web payment using the payment information. The commerce server may charge the payment account associated with the payment information. The commerce server may provide the money from the charge to an account associated with the online merchant. After step 640, the process 600 ends.

Figures 7, 8:
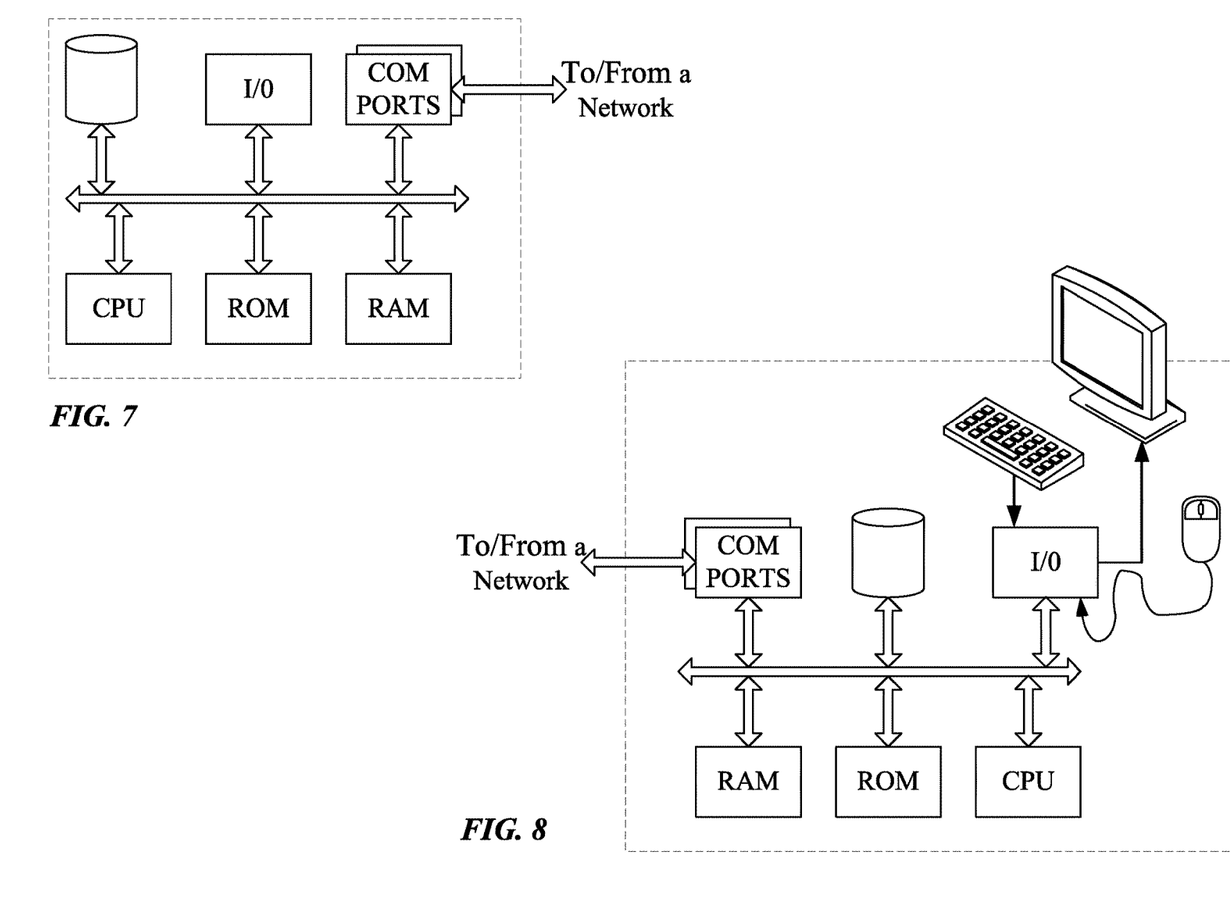
FIG. 7 is a simplified functional block diagram of a computer that may be configured to function as the proxy server or the commerce server shown in FIG. 1.
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that the general structure and general operation of such equipment as shown in FIGS. 7 and 8 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 8). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving at a proxy server, from a server hosting a website, a request for authentication of a mobile device for payment, the request being sent via a computer device accessing the website, the request including a geographical location of the computer device;
   identifying the mobile device based on a geographical proximity of the mobile device to the geographical location of the computer device and determining that the mobile device runs a mobile payment application;
   identifying a mobile directory number (MDN) associated with the identified mobile device;
   authenticating the mobile device associated with the MDN at the proxy server;
   responsive to the request for authentication, sending from the proxy server to the website a challenge for authentication, for providing to the computer device accessing the website;
   receiving at the proxy server, from the mobile device associated with the MDN, via a user interface of the mobile device, a response to the challenge for authentication, the mobile device being other than the computer device accessing the website;
   verifying, at the proxy server, that the response to the challenge for authentication is a valid response; and
   upon verifying the response is the valid response, transmitting from the proxy server to the web site a payment information associated with the MDN.

2. The method of claim 1, wherein:
   the challenge for authentication includes a screen image for the website, for display as a displayed screen image on a screen of the computer device accessing the website, and the response to the challenge for authentication is verified as the valid response upon determining, at the proxy server, that the response includes a photograph of the displayed screen image taken via a camera of the mobile device.

3. The method of claim 1, wherein:
   the challenge for authentication includes an audio output for the website, for audio output from a speaker of the computer device accessing the website, and the response to the challenge for authentication is verified as the valid response upon determining, at the proxy server, that the response includes a recording of the audio output from the speaker taken via a microphone of the mobile device.

4. The method of claim 1, wherein the payment information comprises a payment by a cellular carrier associated with the MDN and a charge billed to an account with the cellular carrier associated with the MDN.

5. A method comprising:
   receiving, at a website hosted by a server and integrated with a mobile communication network payment application interface, a checkout request from a user accessing the website with a computing device, having a mobile account with a mobile communication network;
   presenting on the website a user interface for a user of the computing device accessing the website to select the mobile communication network payment application interface for using the user's mobile account with the mobile communication network for a payment;
   receiving a geographical location of the computing device to help identify a mobile directory number (MDN) associated with the user's mobile account, where the MDN is identified based on a geographical proximity of a mobile device to the geographical location of the computing device and determining that the mobile device runs the mobile communication network payment application interface;
   upon the website receiving from the computing device, through the user interface, the user selection of the mobile communication network payment application interface, sending from the website to a server of the mobile communication network a challenge for authentication, for the server to communicate to and cause to be presented on a user interface of the mobile device associated with the MDN, the mobile device being different than the computing device accessing the website;
   receiving, at the website, from the server of the mobile communication network, an indication of a response to the challenge for authentication having been entered at of the user interface of the mobile device associated with the MDN in response to the presenting on the mobile device of the challenge for authentication; and
   upon verifying at the website, from the indication of the response to the challenge for authentication received from the server of the mobile communication network server, that the response is correct, enabling the user to input information, through the website, to finalize the checkout and pay for purchased items using the user's mobile account with the mobile communication network.

6. The method of claim 5, further comprising finalizing checkout and paying for purchased items by actions including:
   receiving at the website, from the server of the mobile communication network, a payment account number and a shipping address of the user.

7. The method of claim 5, wherein:
the challenge for authentication includes a request for the user to enter, at the mobile device, a numeric or textual pin, and
wherein the response to the challenge for authentication is verified correct upon verifying the response entered at the mobile device associated with the MDN includes a correct numeric or textual pin.

8. The method of claim 5, wherein:
the challenge for authentication includes a request for a biometric scan at the mobile device associated with the MDN, and
wherein the response to the challenge for authentication is verified correct upon verifying the response entered at the mobile device associated with the MDN includes a biometric scan that matches a stored biometric scan associated with the user.

9. The method of claim 5, wherein the indication of the response reflects whether or not the response entered at the mobile device associated with the MDN is correct successful authentication.

10. A method comprising:
receiving, at a proxy server, from a computing device different from a mobile device, a request from a user to process a web payment via a payment account associated with the mobile device, the web payment being associated with an online website and the request including a geographical location of computing device;
identifying the mobile device based on a geographical proximity of the mobile device to the geographical location of the computer device and determining that the mobile device runs a mobile payment application;
identifying a mobile directory number (MDN) associated with the identified mobile device;
verifying, at the proxy server, that the mobile device associated with the MDN is associated with the user; and
transmitting, from the proxy server to a server of the online website, payment information for the web payment in response to verifying that the mobile device is associated with the user;
wherein the MDN is entered at a user interface of the computing device presented to the user.

11. The method of claim 10, wherein verifying that the mobile device associated with the MDN is associated with the user comprises:
transmitting, from the proxy server, a challenge to one of the mobile device or the computing device; and
receiving, at the proxy server and from another one of the mobile phone or the computing device, an indication of a user input corresponding a valid response to the challenge at the other one of the mobile phone or the computing device.

12. The method of claim 10, wherein receiving the request from the user to process the web payment and verifying that the mobile device is associated with the user comprises:
receiving, from the computing device, an indication of a button on the computing device being selected, the button corresponding to the request for processing the web payment via the payment account associated with the mobile device; and
receiving, from the mobile device, an indication of an acceleration of the mobile device being within an acceleration range corresponding to selecting the button on the computing device with the mobile device.

13. The method of claim 10, wherein the mobile device is a mobile phone, the method further comprising:
storing, in a data repository associated with the proxy server, the payment information in association with the MDN of the mobile device.

14. The method of claim 10, further comprising:
receiving, at the server of the online website and from the computing device different from the mobile device, the request from the user to process the web payment via the payment account associated with the mobile device;
requesting from the proxy server payment information associated with the mobile device; and
receiving at the server, from the proxy server, the payment information for the web payment in response to verification that the mobile device is associated with the user; and
processing, at the server, the web payment using the payment information.

15. The method of claim 14, wherein the payment information comprises a payment account number and a shipping address.

16. The method of claim 14, wherein the request from the user to process the web payment via the payment account associated with the mobile device comprises an indication of a button on the computing device being hit, the button corresponding to the request for processing the web payment via the payment account associated with the mobile device.

17. The method of claim 16, wherein the button on the computing device is a spacebar on the keyboard of the computing device, and wherein the button on the computing device is hit with the mobile device.

18. The method of claim 14, wherein receiving the request from the user to process the web payment via the payment account associated with the mobile device comprises:
transmitting to the computing device a challenge to be responded to by user entry into the mobile device having the MDN; and
receiving an indication of a valid response to the challenge having been entered at the mobile device having the MDN.

* * * * *